US008862373B2

(12) United States Patent
Dacre-Wright et al.

(10) Patent No.: US 8,862,373 B2
(45) Date of Patent: Oct. 14, 2014

(54) METHOD, DEVICE AND SYSTEM FOR GUARANTEEING A TEMPORAL SPACING BETWEEN AN AIRCRAFT AND AT LEAST ONE REFERENCE MOVING OBJECT

(71) Applicant: Thales, Neuilly-sur-Seine (FR)

(72) Inventors: Benoit Dacre-Wright, Lauzerville (FR); Guy Deker, Cugnaux (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 13/705,621

(22) Filed: Dec. 5, 2012

(65) Prior Publication Data

US 2013/0144518 A1  Jun. 6, 2013

(30) Foreign Application Priority Data

Dec. 5, 2011 (FR) ...................................... 11 03704

(51) Int. Cl.
G06F 19/00 (2011.01)
B64C 19/00 (2006.01)
G08G 5/00 (2006.01)
(52) U.S. Cl.
CPC .............. *B64C 19/00* (2013.01); *G08G 5/0078* (2013.01); *G08G 5/0039* (2013.01); *G08G 5/0043* (2013.01); *G08G 5/0021* (2013.01)
USPC ....................................................... 701/121
(58) Field of Classification Search
CPC ....... G01C 23/00; G08G 5/0021; G08G 5/045
USPC .......................................................... 701/121
See application file for complete search history.

(56) References Cited

U.S. PATENT DOCUMENTS 7,412,324 B1    8/2008  Bagge et al.
2007/0078573 A1* 4/2007  Ivansson et al. ................ 701/14
(Continued)

FOREIGN PATENT DOCUMENTS

FR    2894056 A1    6/2007
FR    2923032 A1    5/2009
FR    2946161 A1   12/2010
WO  2012/072955 A1    6/2012

OTHER PUBLICATIONS

Eurocontrol, "Flight Deck User Requirements for Airborne Spacing (Sequence and Merging)", European Organisation for the Safety of Air Navigation, vol. 1, Version 2.3, Jul. 2006.

(Continued)

*Primary Examiner* — James Trammell
*Assistant Examiner* — Michael D Lang
(74) *Attorney, Agent, or Firm* — Baker & Hostetler LLP

(57) ABSTRACT

A method is provided for guaranteeing a temporal spacing between an aircraft and at least one reference moving object, said spacing needing to be guaranteed no later than at a point in the flight plan called the point of interception, with the aircraft following a current flight plan. The feasibility of guaranteeing the spacing at a date Tcour by regulating the speed of the aircraft while maintaining the current flight plan is verified in a first step. In a second step it is verified whether the date Tcour is contained within a feasibility range. In a third step the current flight plan is modified when the feasibility is not verified, a lateral trajectory between the current position Xcour of the aircraft and the point of interception being implemented in this case such that the spacing can be attained by regulating the speed.

21 Claims, 5 Drawing Sheets

(56) References Cited

U.S. PATENT DOCUMENTS

| | | | |
|---|---|---|---|
| 2008/0103647 A1 | 5/2008 | Lucas et al. | |
| 2009/0112454 A1 | 4/2009 | Wachenheim et al. | |
| 2009/0319101 A1 | 12/2009 | Coulmeau | |
| 2010/0131124 A1 | 5/2010 | Klooster | |
| 2011/0137493 A1 | 6/2011 | Dacre-Wright et al. | |
| 2012/0123628 A1 * | 5/2012 | Duggan et al. | 701/24 |

OTHER PUBLICATIONS

Eurocontrol, "Flight Deck User Requirements for Airborne Spacing (Sequence and Merging)", European Organisation for the Safety of Air Navigation, vol. 2, Annex, Version 2.3, Jul. 2006.

* cited by examiner

US 8,862,373 B2

METHOD, DEVICE AND SYSTEM FOR GUARANTEEING A TEMPORAL SPACING BETWEEN AN AIRCRAFT AND AT LEAST ONE REFERENCE MOVING OBJECT

CROSS-REFERENCE TO RELATED APPLICATION

This application claims priority to foreign French patent application No. FR 1103704, filed on Dec. 5, 2011, the disclosure of which is incorporated by reference in its entirety.

FIELD OF THE INVENTION

The invention relates to a method, a device and a system for guaranteeing a temporal spacing between an aircraft and at least one reference moving object.

It applies notably to the fields of navigation and of surveillance systems for aircraft.

BACKGROUND

Cooperative surveillance systems notably allow determination of the position of a plurality of aircraft by relying on satellite positioning systems such as the Galileo, GPS or GLONASS system. These systems can operate in broadcast mode or in connected mode. An example of a system operating in broadcast mode is the ADS-B system, ADS-B standing for "Automatic Dependant Surveillance-Broadcast". In this type of system, the aircraft are equipped with transponders. They assess their positions and transmit them regularly with other information to other aircraft or to stations on the ground. If some aircraft are not equipped with transponders, the TIS-B service, TIS-B standing for "Traffic Informations Services-Broadcast", allows information notably detected by means of ground radar to be sent to the various aircraft.

Cooperative surveillance systems can be used notably for implementing equipment allowing collisions between aircraft to be avoided and are usually denoted by the acronym TCAS, standing for "Traffic Collision Avoidance System". When two aircraft are close to one another, the TCAS informs the pilot of the first aircraft about the proximity of a second aircraft. A manoeuvre called spacing can then be implemented. These means generally belong to the category of safety nets, which are intended to increase air safety by providing a surveillance function and emergency manoeuvres, which are totally independent of the navigation.

Another use for cooperative surveillance means is beginning to appear, this time integrated in the navigation functions, in order to improve air navigation, facilitate traffic, and maintain or increase air safety within a context of constantly increasing traffic. The management of the spacing and separation in relation to the surrounding traffic is thus delegated to the crew of the aircraft by air traffic control. The relevant capabilities are integrated in the onboard navigation means, which integrate the spacing and separation constraints in their manoeuvre capabilities.

Several types of spacing manoeuvres can thus be considered. They are usually based on a speed calculation by a piece of Traffic Management equipment, which may or may not be coupled to the TCAS traffic surveillance equipment, and rely on position and ground speed measurements and on indications of time and trajectory length which are provided by the FMS navigation system, FMS standing for "Flight Management System". A lateral trajectory, that is to say a trajectory aimed at modifying the route distance between two points on the flight plan, can also be determined by the FMS, and is taken into account in the speed calculation essentially by a distance calculation along said trajectory.

When a spacing manoeuvre is required by air traffic control and needs to be accepted by the crew on the aircraft, it is advisable to determine the feasibility thereof, that is to say to determine whether it can be implemented in practice. This feasibility assessment and the robustness of execution thereof come up against several limitations. Firstly, the performance of the aircraft is known at best only from the theoretical flight envelope in terms of minimum and maximum speeds. Next, the impact of the wind on speed holding is not taken into account, or is taken into account only imperfectly, because to do so well requires measurement not only of the wind but also of the projection thereof on the lateral trajectory. Finally, speed holding is strongly coupled to the vertical profile, that is to say to the change in altitude along the trajectory, with the vertical profile limiting the acceleration and deceleration capabilities and also the minimum flyable speed along this profile. For this reason, the feasibility assessment for a spacing manoeuvre at speed or for a lateral trajectory is necessarily simplified and does not take account of the various factors which can disrupt the spacing manoeuvre. Moreover, execution of the manoeuvre is based on a speed calculation which does not take account of these various disruptions and which can thus lead to failure of the manoeuvre. It is therefore necessary to anticipate these factors and then to monitor feasibility during execution.

SUMMARY OF THE INVENTION

An aim of the invention is notably to overcome the aforementioned drawbacks.

To this end, the subject matter of the invention is a method for guaranteeing a temporal spacing between an aircraft and at least one reference moving object, said spacing needing to be guaranteed no later than at a point in the flight plan called the point of interception, with the aircraft following a current flight plan, the feasibility of guaranteeing the spacing at a date Tcour by regulating the speed of the aircraft while maintaining the current flight plan being verified in:

a step of determination of two speed profiles $Tmin(X)$, $Tmax(X)$ and guaranteeing the spacing at a date ETAreq associated with the point of interception, a speed profile being composed of points indexed by a date T and a position index X, the two speed profiles $Tmin(X)$, $Tmax(X)$ being determined by taking into account the minimum speed and maximum speed, respectively, which the aircraft can attain, a step verifying whether the date Tcour is contained within a feasibility range, the two limits Bmin, Bmax of which are respectively equal to the values taken by the two speed profiles $Tmin(X)$ and $Tmax(X)$ for the position Xcour of the aircraft at the date Tcour, with the feasibility being verified in this case, a step modifying the current flight plan when the feasibility is not verified, a lateral trajectory between the current position Xcour of the aircraft and the point of interception being implemented in this case such that the spacing can be attained by regulating the speed.

In one embodiment, a step acquires the point of interception and assesses the required date of transit ETAreq for the aircraft at the point of interception, this date of transit being assessed on the basis of predictions of the transit times of the reference moving object.

In one embodiment, a step acquires the distance D between the reference moving object and the point of interception, the required date of transit ETAreq for the aircraft at this point then being deduced from this distance such that the delay ASG is guaranteed at the date ETAreq. ASG is an acronym standing for "Assigned Spacing Goal" and denoting the required spacing.

By way of example, the distance D is assessed on the basis of stored information relating to the trajectory of the reference moving object and/or on the basis of predictions of the trajectory of the reference moving object.

The distance D is assessed by assuming, for example, that the reference moving object flies directly towards the point of interception.

The reference moving object regularly, for example, transmits an assessment of the distance D to the aircraft.

By way of example, the method comprises a step modifying the speed profile Tmin(X) so as to take into account a deceleration towards the assessed speed of the reference moving object at the point of interception so as to reduce the difference between the speed of the aircraft and the speed of the reference moving object upon transit by the point of interception.

By way of example, the method comprises a step modifying the speed profile Tmax(X) so as to take into account an acceleration towards the assessed speed of the reference moving object at the point of interception so as to reduce the difference between the speed of the aircraft and the speed of the reference moving object upon transit by the point of interception.

These profile modifications for the speed profiles Tmin(X) and Tmax(X) allow maintenance of the spacing to be improved after the point of interception.

In one embodiment, a step determines the length $\delta D$ by which the trajectory stored in the current flight plan needs to be modified.

According to one aspect of the invention, the time difference Ec between the current date Tcour and the limits of the feasibility range is determined, the length $\delta D$ being deduced by using the following expression:

$$\delta D = Ec/V\text{ground}$$

in which Vground is chosen as a function of the resolution strategy between:
the current ground speed GS(X_cour) of the aircraft;
or the current minimum ground speed Vmin(X_cour) of the aircraft at this point;
or the current maximum ground speed Vmax(X_cour) of the aircraft at this point.

Other resolution strategies can likewise be used for determining the length $\delta D$. By way of example, Vground may be chosen to be equal to the ratio between the current ground speed of the aircraft and the assessed speed of the reference moving object at a point of convergence with the initial trajectory as was defined before the step of modification of the flight plan.

According to one embodiment, the distance $\delta D$ is augmented by adding a robustness margin.

The lateral trajectory is determined by selecting at least one turning point so as to adjust the length of the current trajectory between the current position and the point of interception of length $\delta D$.

By way of example, the lateral trajectory corresponds to the trajectory defined by a first point called the point of divergence, at least one turning point and a point of convergence. By way of example, the point of divergence and the point of convergence are chosen so that they are positioned on the initial trajectory as was defined before the step of modification of the flight plan, and no later than at the point of interception.

According to one aspect of the invention, the minimum and maximum speeds which can be attained respectively correspond firstly to the minimum authorized and flyable speed and secondly to the maximum authorized and flyable speed.

By way of example, the speed of the aircraft is adapted using speed instructions, said instructions being determined in order to ensure the acquisition and then maintenance of said spacing in relation to the reference moving object and being sent to the automatic pilot of the aircraft.

The subject matter of the invention is also a device for controlling the temporal spacing between at least one aircraft in which the method described above is implemented and at least one reference moving object.

The control device may be on board an aircraft.

Alternatively, the control device may be installed in a station on the ground. By way of example, this device has information pertaining to positions, speeds, trajectories and also other parameters relating to the two aircraft. The device may thus constitute a decision aid for the air traffic controller, before he requests a spacing manoeuvre from an aircraft.

The subject matter of the invention is also a system for guaranteeing a temporal spacing between at least one aircraft and at least one reference moving object, said system comprising means distributed between said aircraft and a control station on the ground in order to implement the method described above.

In one embodiment of this system, the ADS-B standard is implemented.

BRIEF DESCRIPTION OF THE DRAWINGS

Other features and advantages of the invention will emerge with the aid of the description which follows, which is provided by way of non-limiting illustration and with reference to the appended drawings, in which.

DETAILED DESCRIPTION

Figure 1:
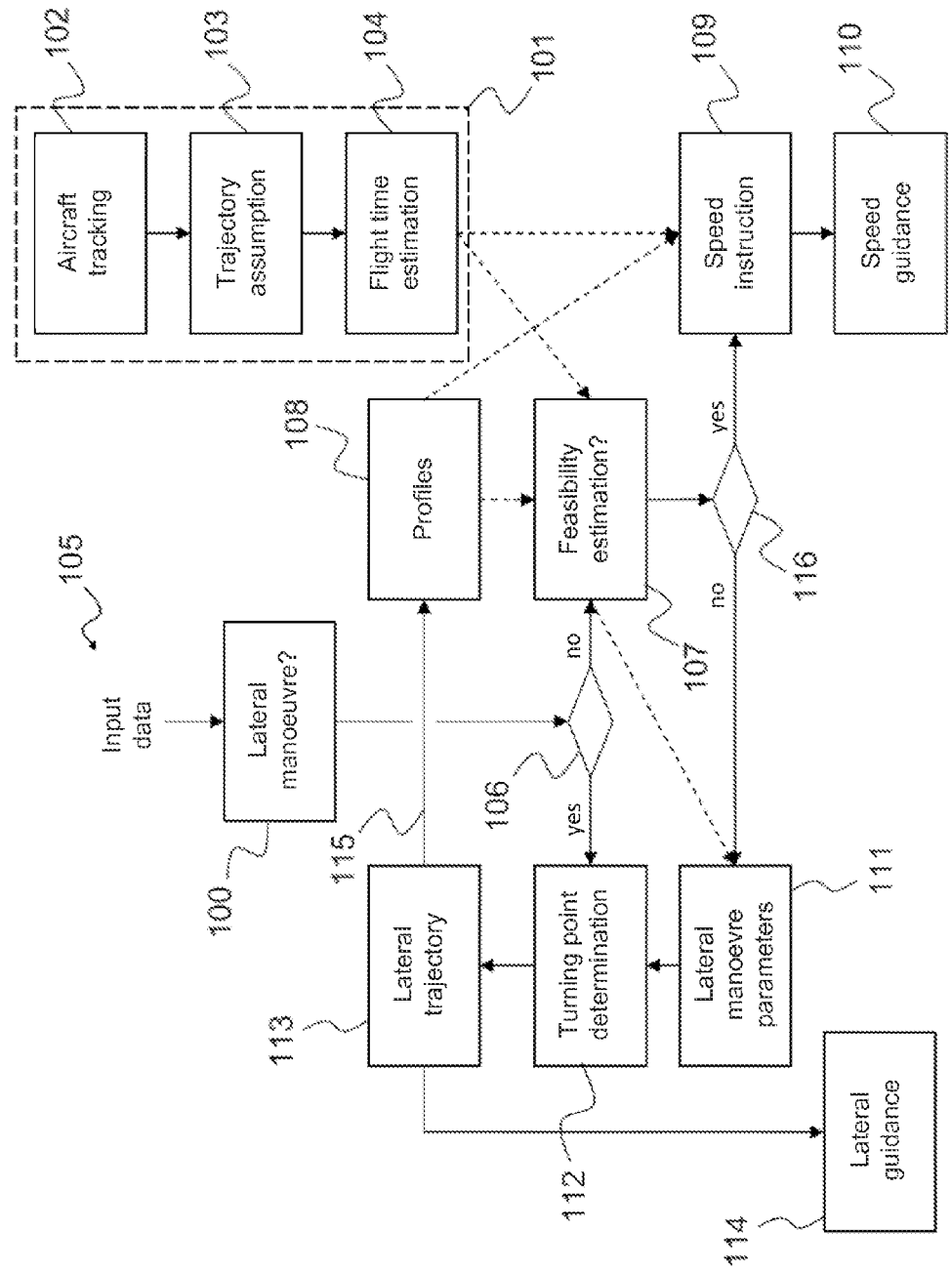
FIG. 1 shows a simplified chart for a method allowing an aircraft to guarantee a required temporal spacing from at least one other aircraft.

FIG. 1 shows a simplified chart for a method allowing an aircraft to guarantee a required temporal spacing from at least one other aircraft. In the rest of the description, the required spacing is denoted by the acronym ASG standing for "Assigned Spacing Goal". In this example, the method is described as being implemented by equipment on board an aircraft. However, the method can also be implemented on a station on the ground, to the benefit of the controller who has to determine and request a manoeuvre from an aircraft.

To that end, the predictions by the FMS system are used in the calculation of a spacing manoeuvre, and more specifically of the predictions of expected times of arrival T_Vmin(X) at minimum speed and of expected times of arrival T_Vmax(X) at maximum speed along the trajectory of the aircraft. The profiles T_Vmin and T_Vmax are sometimes called ETA_max profile and ETA_min profile, respectively, ETA standing for "Estimated Time of Arrival". By way of example, the spacing manoeuvre is implemented by an ASAS system, ASAS standing for "Airborne Separation Assistance System". If the method is implemented in a station on the ground, a BADA model, BADA standing for "Base of Aircraft Data", or equivalent can be used. A feasibility criterion for the spacing manoeuvre is defined so as to take into account the effective performance of the aircraft and all the information available on the trajectory, such as the vertical profile and the environmental conditions, particularly wind and temperature.

The principle is to verify whether it is feasible to guarantee the spacing simply by regulating the speed of the aircraft along the flight plan. If this is not feasible, the method proposed aims to determine the extension or shortening of the current trajectory so as to provide the required spacing between the aircraft.

As input data 105, the method according to the invention notably uses a spacing instruction which may be accompanied by a lateral manoeuvre request. This instruction can be transmitted to the aeroplane by an air traffic controller or else can be determined by the pilot of the aircraft.

Furthermore, information concerning the surrounding air traffic and the identification of the aircraft in relation to which the spacing needs to be calculated, and the flight parameters of said aircraft, is used. In the rest of the description, the aircraft in relation to which the spacing needs to be calculated is called the reference moving object.

The information concerning the surrounding air traffic is determined and updated by a set of steps 101 which comprises a step of tracking 102, a step of trajectory assumption determination 103 and a step of flight time assessment 104.

The step of tracking 102 aircraft has the objective of maintaining an assessment of the current state of the surrounding aircraft. By way of example, the current state of an aircraft corresponds to two sets of information. The first set corresponds to information relating to the position of the aircraft which is or are to be tracked, such as latitude and longitude. The second set corresponds to information relating to the displacement of the aircraft which is or are to be tracked, such as ground speed and current heading, for example. Altitude and vertical speed can likewise be used. The information about the displacement of the aircraft may include information about the route or the next transit points for the aircraft which are to be tracked, for example information provided in the ADS-B standard, but not yet utilized. By way of example, the tracking of aircraft 102 is based on the utilization of information received from the surrounding air traffic by aircraft-to-aircraft communication means. This tracking is possible by relying notably on systems such as ADS-B, ADS-R and TIS-B, standing for "Automatic Dependent Surveillance-Broadcast", "Automatic Dependent Surveillance-Report" and "Traffic Information Service-Broadcast", respectively, or other services allowing equivalent data to be acquired.

On the basis of the information collected during traffic tracking 102, it is possible to make assumptions and to predict 103 the trajectories of the surrounding aircraft. By way of example, an assumption can be made simply and reliably when a neighbouring aircraft is flying directly towards a designated point.

Whether on the basis of information about the future trajectory of the reference moving object that is received from the surrounding traffic or else from air traffic control, or whether on the basis of assumptions 103 associated with the manoeuvre in progress, the flight time of the reference moving object towards a reference point on its trajectory is assessed 104, as is the remaining flight distance to the reference point, over the course of time.

Steps 102, 103, 104 are executed sufficiently frequently for the flight time assessments to be able to be utilized reliably, for example every 5 seconds.

According to the instruction provided at the input 105 by the crew or by air traffic control according to the operational procedure employed, a spacing manoeuvre implementing a lateral trajectory may be required from the outset. A test 100 performed on the input instructions determines whether such a manoeuvre is actually required. On the basis of the result of this test 100, the progress of the method may be different 106 as explained below.

If a spacing manoeuvre implementing a lateral trajectory is not required from the outset in the input data 105, a step 107 will be used in order to determine whether it is feasible to guarantee the spacing required by simply regulating the speed of the aircraft.

To this end, time profile predictions 108 are set up by the aircraft implementing the method along the whole flight plan by taking into account the performance of the aircraft and the weather environment model. These predictions correspond to a time profile T_Vmax(X) from flight at maximum attainable speed and to a time profile T_Vmin(X) from flight at minimum attainable speed.

The time profile predictions are made by taking into account the minimum and maximum attainable speeds corresponding, by way of example, to the maximum authorized and flyable speed, on the one hand, and to the minimum authorized and flyable speed, on the other hand. These speeds are called authorized in the sense that they take into account constraints such as constraints associated with air traffic control or else operational limitations declared by the operator. Moreover, these are speeds referred to as flyable to the extent that they are compatible with the performance of the aircraft implementing the method. The speed profiles T_Vmin(X) and T_Vmax(X) may be determined by using the method described in French Patent Application 09 02613.

The feasibility of the spacing manoeuvre is assessed 107 on the basis of the speed profiles T_Vmin(X) and T_Vmax (X). Two situations may then be encountered.

The first situation corresponds to the case in which it is considered to be feasible to attain the required spacing by modifying the speed instructions for the aircraft.

The second situation corresponds to the case in which it is not considered to be feasible to attain the required spacing by modifying the speed instructions for the aircraft. The method will thus determine a lateral trajectory to allow said spacing to be attained.

Following the feasibility assessment 107, two cases 116 are distinguished. Even if it is considered to be feasible to attain the required spacing by modifying the speed instructions for the aircraft, new speed instructions are determined 109 in order to ensure the acquisition and then maintenance of said spacing in relation to the reference moving object and are then sent 110 to the automatic pilot, according to the logic of required modes of guidance for following the altitude and speed of the vertical flight profile.

If it is not considered to be feasible to attain the required spacing by modifying the speed instructions for the aircraft, a lateral trajectory needs to be determined and then implemented. The preparation for this manoeuvre consists in the determination of parameters 111, such as speed, which, as the case may be, is the current speed if speed changes are required to be avoided for reasons of comfort or engine operation, or, as the case may be, the maximum or minimum speed, and the distance required between the current position and the point of interception, and the determination of at least one turning point 112. A point of interception is a point on its current trajectory at which the aircraft must have guaranteed the required spacing from the reference moving object.

The turning point is determined 112 such that it allows the sought-after spacing to be ensured at the speed previously under consideration. The corresponding manoeuvre is then inserted 113 into the flight plan. For a given flight plan, the lateral trajectory is determined by taking into account the altitude and speed assumptions from the speed profile predictions.

The lateral trajectory determined in this way is then used to determine the instructions to be sent to the automatic pilot of the aircraft in order to ensure trajectory guidance 114 in line with the required navigation performance.

The lateral trajectory 113 determined in this manner is likewise used 115 in order to update 108 the profiles T_Vmin(X) and T_Vmax(X). It is then possible to periodically verify, for example every fifteen seconds, that the desired spacing is attainable on the basis of said lateral trajectory.

Figure 2:
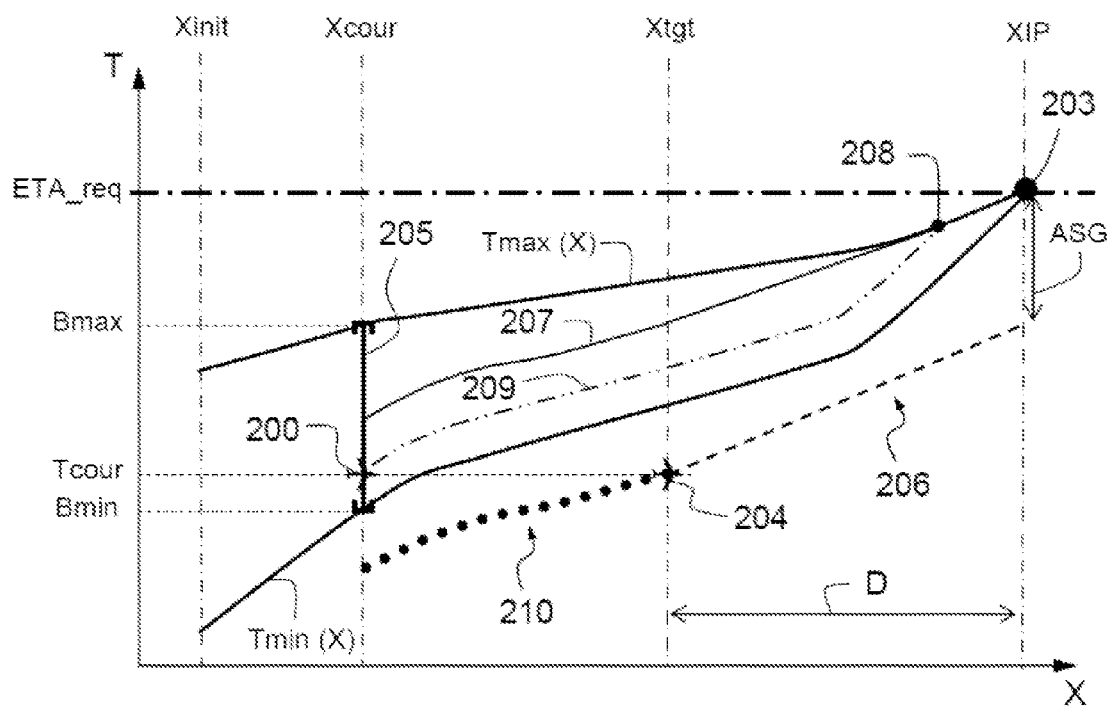
FIG. 2 shows a time/distance graph containing the minimum speed Tmin(X) and maximum speed Tmax(X) profiles for a given aircraft which allow a given point of interception to be attained.

FIG. 2 shows a time/distance graph which contains the profiles Tmin(X) and Tmax(X) for a given aircraft which allow a given point of interception to be attained at the desired time at minimum speed and maximum speed, respectively.

In future, the letter X denotes the curvilinear abscissa of an aircraft 200 along a flight plan. In other words, X denotes a distance along the flight plan between a point on the flight plan and a reference point on the flight plan. A prediction of the time of transit T(X) of the aircraft 200 on the curvilinear abscissa X is made at a point on the abscissa Xinit. This point is modified upon each fresh calculation of the profiles. The rate of these calculations remains low, said rate being chosen in order to compensate for drifts other than time drift, since the method advantageously suffices to compensate for time differences between the predictions and the flown trajectory.

As explained previously, the method comprises a step that is aimed at determining two reference profiles, one at minimum speed T_Vmin(X) and the other at maximum speed T_Vmax(X), these two profiles being calculated on the same current trajectory, starting from an abscissa calculation reference point Xinit. Two minimum speed Tmin(X) and maximum speed Tmax(X) profiles are deduced by translation along the time axis directly from T_Vmin(X) and T_Vmax(X) such that they pass through the point of interception on the abscissa X_IP, at the required date of transit ETA_req.

By way of example, for each of these two profiles Tmin(X) and Tmax(X), the times of transit and the current ground speeds are saved. These values are thus available for any curvilinear abscissa X along the trajectory. It is therefore possible to obtain the minimum and maximum ground speeds Vmin(X) and Vmax(X), respectively, and the time of transit at minimum speed T_Vmin(X) and the time of transit at maximum speed T_Vmax(X) of the aircraft for any value of X. These values correspond to predictions which take into account the constraints that the aircraft must observe in the course of the trajectory followed towards the point of interception 203. Advantageously and in order to save memory, it is also possible to save them only for changes of lateral segments or on the transit points on the trajectory. It should be remembered that a segment appears as a straight or curved portion connecting two successive points on a given flight plan. A segment is usually denoted by the word "leg".

If a spacing manoeuvre implementing a lateral trajectory is implemented, the aircraft will have to transit at a given point 203 called the point of interception while guaranteeing the required spacing between the aircraft 200 and the reference moving object 204 at this point, said spacing corresponding to a time delay ASG in relation to a reference moving object denoted by 204. To this end the distance D between the reference moving object and the point of interception 203 is assessed, a required data of transit ETA_Req at this point then being deduced such that the delay ASG is guaranteed at the date ETA_Req.

The distance D between the position of the reference moving object 204 and the point of interception 203 can be assessed on the basis of stored information 210 relating to its route or on the basis of predictions from the reference moving object. This assessment can be made by relying on the assumption that the reference moving object flies directly 206 towards the point of interception 203.

Alternatively, the reference moving object 204 can transmit an assessment of D to the aircraft 200 which it will itself have made. The dates of transit ETA, standing for "Expected Time of Arrival", which are associated with each speed profile so as to attain the point of interception 203 on the abscissa X_PI at the instant ETA_req can then be deduced from the distance D.

As mentioned previously, the two profiles Tmin(X) and Tmax(X) associated with the speeds Vmin(X) and Vmax(X) are deduced from the profiles T_Vmin(X) and T_Vmax(X), respectively, by translation and represent limits which allow the required spacing to be guaranteed.

Thus, the profile Tmin(X) required for adhering to the required spacing ASG while flying at the speed Vmin can be determined by using the following expression:

$$T\min(X) = T\_V\min(X) + ETA\_Req - T\_V\min(X\_PI) \quad (1)$$

Similarly, the ETA required for adhering to the required spacing ASG while flying at the speed Vmax can be determined by using the following expression:

$$T\max(X) = T\_V\max(X) + ETA\_Req - T\_V\max(X\_PI) \quad (2)$$

In a variant of the method, the trajectory on which the two profiles T_Vmin(X), T_Vmax(X) (and therefore Tmin(X) and Tmax(X)) are calculated corresponds initially to the trajectory obtained for the initial speed profile, that is to say the speed profile before the spacing manoeuvre that implements a lateral trajectory.

The transit points between segments of the lateral trajectory can be determined on the basis of the speed of the current speed profile when said speed has been augmented by a robustness margin which allows, from one refreshment of the speed profile to the next, compensation for possible speed variations.

It may be noted that the trajectory defined in this manner will not be flyable at the maximum speed, but the maximum speed profile is intended only to provide a transit time reference on the curvilinear abscissa of a common lateral trajectory.

A variant of the method is also proposed by determining different flyable trajectories for the minimum speed profile Tmin(X) and the maximum speed profile Tmax(X). The comparison of the curvilinear abscissae along the trajectories, notably in order to apply the feasibility criterion, is thus made in relative fashion in relation to the transit points between segments along each trajectory. This variant allows the precision of the predictions to be improved.

As introduced previously and in order to determine the feasibility of the spacing manoeuvre on the basis of the current trajectory, a feasibility criterion is used. This feasibility criterion is applied to the current trajectory by taking into account the current position Xcour and the current date Tcour of the aircraft. The spacing manoeuvre is considered to be feasible on the basis of the current trajectory when the current date Tcour to which the criterion is applied is within the range 205 defined by the values taken by the profiles Tmin(X) and Tmax(X) at the instant Tcour, said range being able to be written [Bmin, Bmax] where Bmin=Tmin(Xcour) and Bmax=Tmax(Xcour).

The feasibility criterion is determined in two different ways according to whether the system is in a phase of acquiring the spacing or in a phase of maintaining the spacing. The phase of acquiring the spacing corresponds to the phase during which the spacing manoeuvre is determined on the basis of a required spacing instruction that is to be taken into account. This corresponds to the first iteration of the method described with reference to FIG. 2. The phase of maintaining the spacing is the following phase, consisting in verifying that said spacing can be maintained on the basis of the previously determined spacing manoeuvre or whether it is necessary to adapt the speed parameters and/or to adapt the trajectory.

In the phase of acquiring the spacing, the feasibility criterion is determined by taking as a reference the position of the point of interception 203 and the assessment of the date of transit ETA_tgt(X_IP) of the reference moving object 204 at the point of interception 203 augmented by the required temporal spacing ASG.

In the phase of maintaining the spacing, the feasibility criterion is determined by taking as a reference the current position of the reference moving object and the current date Tcour augmented by the required spacing ASG.

When the feasibility criterion is verified, the assessed speed profile of the reference moving object is used to determine a reference speed profile 207. To this end, the assessed speed profile of the reference moving object is translated along the time axis such that it meets the point of interception 203. The speed profile for the current trajectory 209 is then adapted such that it meets the reference profile 207 at a point 208 of acquisition of the spacing that is denoted by the acronym AE. So that the spacing ASG is observed at the point of interception, it is necessary for the point AE 208 to be placed before the point of interception 203.

Figure 3:
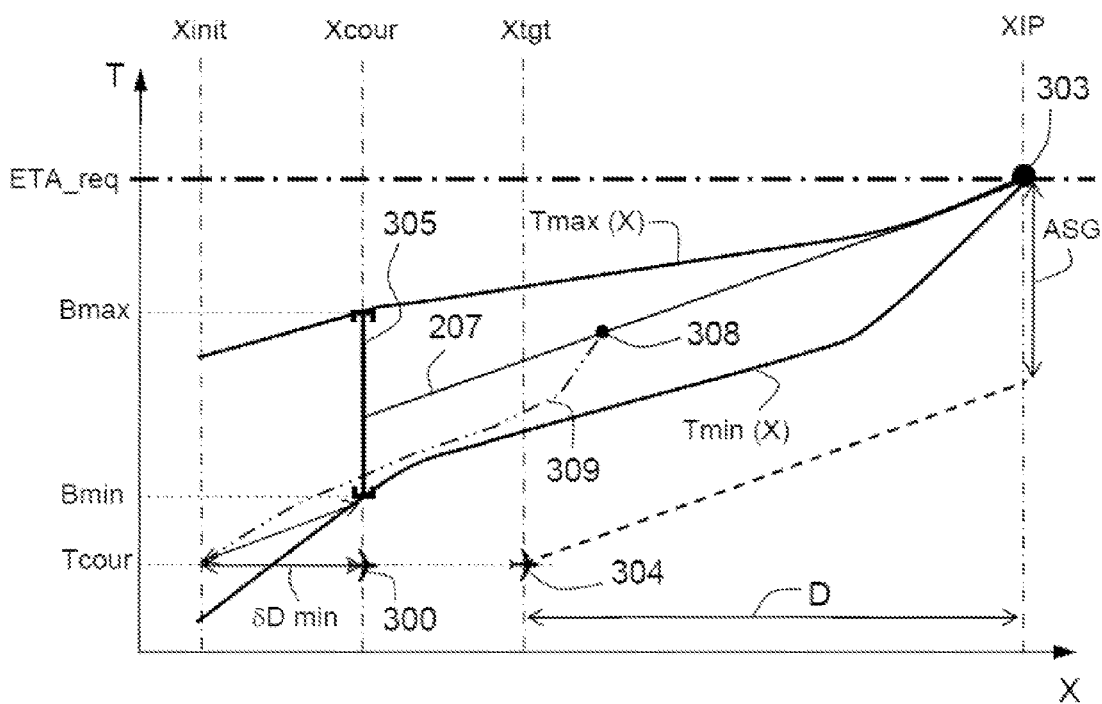
FIG. 3 shows a time/distance graph in the case of an aircraft which does not verify a feasibility criterion.

FIG. 3 shows a time/distance graph in the case of an aircraft which does not verify the feasibility criterion.

In the case in which the current date Tcour is outside the feasibility range 305, the feasibility criterion is not verified.

As explained previously, the method in this case performs a step allowing modification of the length of the current trajectory such that the spacing ASG is attainable. In other words, a lateral trajectory is determined. It is thus at first advisable to determine the length δD by which the current trajectory needs to be modified. To this end, the time difference Ec between the current date Tcour and the limits of the feasibility range 305 can be determined, said difference being able to be expressed using the following expression:

$$Ec = \max((Tmin - Tcour), 0) + \min((Tmax - Tcour), 0) \quad (3)$$

in which:
the function min[a, b] returns the minimum of quantities a or b.

The length δD can then be deduced from the following expression:

$$\delta D = Ec / GS(X\_cour) \quad (4)$$

in which GS(X_cour) denotes the current ground speed of the aircraft.

In one embodiment, the distance δD as expressed using (4) may possibly be augmented by adding a robustness margin and by taking into account the most adverse projection of the current measured wind.

In another embodiment, the speed GS(X_cour) can be replaced by Vmin(X_cour) if the aim is to minimize the distance augmentation (that is to say to be closest to the initial lateral trajectory), or by Vmax(X_cour) in the opposite case.

Once the distance δD is determined, two solutions can notably be envisaged for determining the lateral trajectory and its associated speed profile 309.

A first solution can be implemented when a point of lateral interception has already been identified along the current trajectory. Such a point of lateral interception can be identified in dedicated procedures or can be provided by air traffic control according to a given operational procedure. The lateral trajectory is thus determined so as to meet up with this point.

A second solution is to look for the best possible location along the current trajectory and to propose this location as a point of lateral interception to the pilot or to the air traffic controller.

Figure 4:
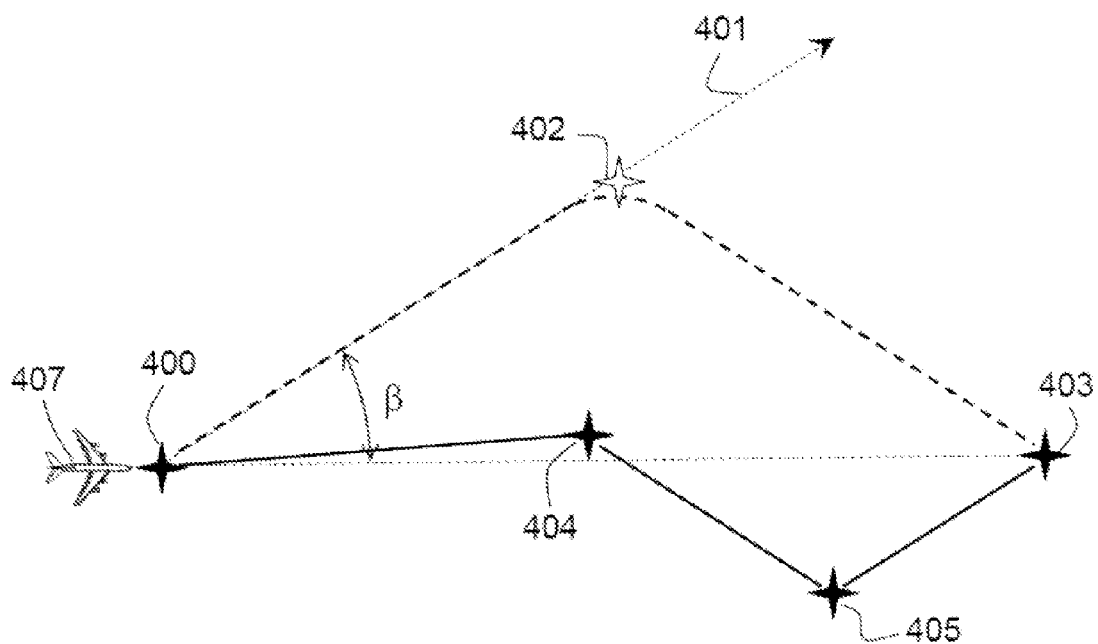
FIG. 4 provides an example of extension of the trajectory of an aircraft.
Figure 4:

FIG. 4 provides an example of trajectory extension. In this example, the initial trajectory passes notably through four points 400, 404, 405, 403. If a lateral trajectory needs to be implemented in order to guarantee a given spacing between the aircraft 407 and a reference moving object 406, a manoeuvre can be determined from a given point 400 by determining a heading 401 and then by calculating a turning point 402 from this heading towards a point of lateral interception 403 chosen along the flight plan. This type of manoeuvre is commonly referred to by the expression "Vector Then Merge". The heading 401 and the position of the turning point 402 are chosen so as to allow the required extension to be ensured. The method does not require the point of lateral interception to necessarily correspond to the point of interception of the temporal spacing, for which the required spacing from a reference moving object 406 is guaranteed.

Figure 5:
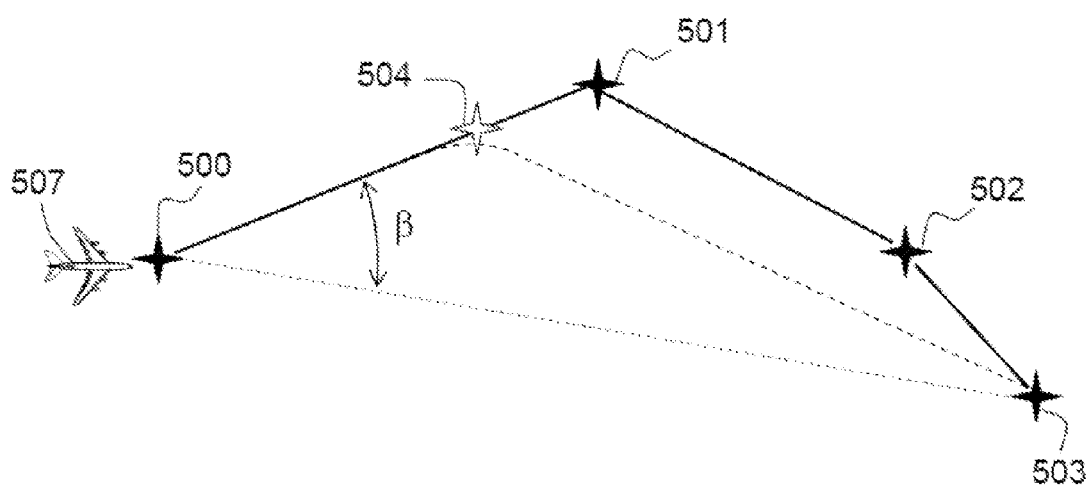
FIG. 5 provides an example of shortening of the trajectory of an aircraft.
Figure 5:

FIG. 5 provides an example of trajectory shortening. In this example, the current trajectory of the aircraft 507 notably comprises four points 500, 501, 502, 503. If the trajectory needs to be shortened, a manoeuvre can be determined by looking for a turning point 504 along the current trajectory, that is to say the one stored in the current flight plan. The aircraft then flies directly towards a point of lateral interception 503 chosen along the flight plan. The method does not require the point of lateral interception to necessarily correspond to the point of interception of the temporal spacing, for which the required spacing from a reference moving object 506 is guaranteed. This type of manoeuvre is commonly referred to by the expression "Follow Route Then Merge".

As far as the determination of the speed instruction is concerned, two options can be considered. The first is based on the assessment of the time differences at the point of interception, and the second is based on distance differences at the current instant.

As far as the case in which the time differences are used is concerned, the speed instruction $V_{ASAS}$ can be determined according to the principles set out for an RTA, "Requested Time of Arrival", instruction, in French Patent Application no. 0902613. When adapted for a spacing instruction, the speed instruction $V_{ASAS}$ can thus be determined by using the following expression:

$$V_{ASAS}(X) = \frac{(T_{max}(X) - T_{min}(X))V_{min}(X)V_{max}(X)}{(T_{max}(X) - T(X))V_{max}(X) - (T_{min}(X) - T(X))V_{min}(X)} \quad (5)$$

The instruction $V_{ASAS}$ determined in this manner adapts itself naturally to the change in the position and speed of the reference moving object which appear in the calculations of Tmin(X) and Tmax(X). If the reference moving object has already transited the point of interception, the determination of the speed instruction advantageously relies on the real date of transit of the reference moving object, rather than on an assessment.

Once in the maintenance phase, the speed instruction may still be enslaved according to expression (5) in seeking to transit to the current position of the reference moving object at a date ETA_req equal to the current date augmented by the required spacing.

As far as the case in which the distance differences are used is concerned, the speed instruction may be enslaved according to the enslavement algorithm over the recorded positions of the reference moving object as published by Eurocontrol, "Flight deck URD for airborne spacing (sequencing and merging)", Flight deck URD, Volume 1, Version 2.3, July 2006.

The first option allows the performance of the aeroplane to be best taken into account and allows the effect of the wind along the lateral trajectory to be anticipated.

The second option allows the speed profile followed by the reference moving object to be followed more closely, and therefore allows a reduction in the effects of propagation of the speed variations along a succession of traffic spaced by ASAS.

In all cases, the assessment of the profiles Tmin(X) and Tmax(X) which are associated with the current position of the reference moving object makes it possible to permanently have an assessment of the feasibility of maintaining the spacing, and to provide a warning as soon as possible when the spacing cannot be held with the current trajectory.

When the manoeuvre is initialized, and throughout its execution, the pilot can be informed of the feasibility of the spacing manoeuvre by the display on the visual display screens in the cockpit, in alphanumeric or graphical form, notably of the following information: the times Tmin and Tmax and the current time, the current instruction speed and the speeds Vmin and Vmax, the current spacing and the period remaining before the required spacing is acquired.

In one embodiment of the invention, the information in alphanumeric form can be provided on a dedicated page among the navigation pages.

In another embodiment, the information can be visually displayed in graphical form by a timescale placed on the navigation screen, close to the reference moving object, or carried forward in distance form along the trajectory.

When a lateral manoeuvre is worked out, the feasibility range can be carried forward in distance form along the new lateral trajectory, in order to allow the pilot to evaluate his feasibility margins within the context of this new manoeuvre.

When the aircraft follows an RTA profile, the speed strategy may lead to other traffic being approached, at the risk of violating the separation minima. It is thus possible to calculate an RTA speed instruction $V_{RTA}$ according to the method as disclosed in French Patent Application no. 0902613 and to calculate a speed instruction $V_{ASAS}$ which makes it possible to set up a spacing from the closest traffic which is equal to the required minimum separation.

The speed instruction applied may thus be the RTA speed instruction $V_{RTA}$, but taking into account a limit corresponding to the speed instruction $V_{ASAS}$. This makes it possible to guarantee the separation minima between aircraft.

The feasibility of complying with the RTA constraint can be assessed on the basis of the same criteria as for the feasibility of the spacing, by comparing the current date with the range [Tmin(X),Tmax(X)] calculated for the RTA instruction.

Advantageously, the two constraints of RTA and of maintaining the spacing can be ensured jointly. If the constraint of maintaining the spacing prevents adherence to the RTA instruction, this situation can be detected by the crew, for example, which can inform air traffic control.

It is thus possible to choose to adopt the speed instruction $V_{ASAS}$ to favour maintaining the spacing to the detriment of the RTA constraint. The controller can likewise confirm adherence to the RTA constraint, while taking charge of maintaining the separation by other means.

Figure 6:
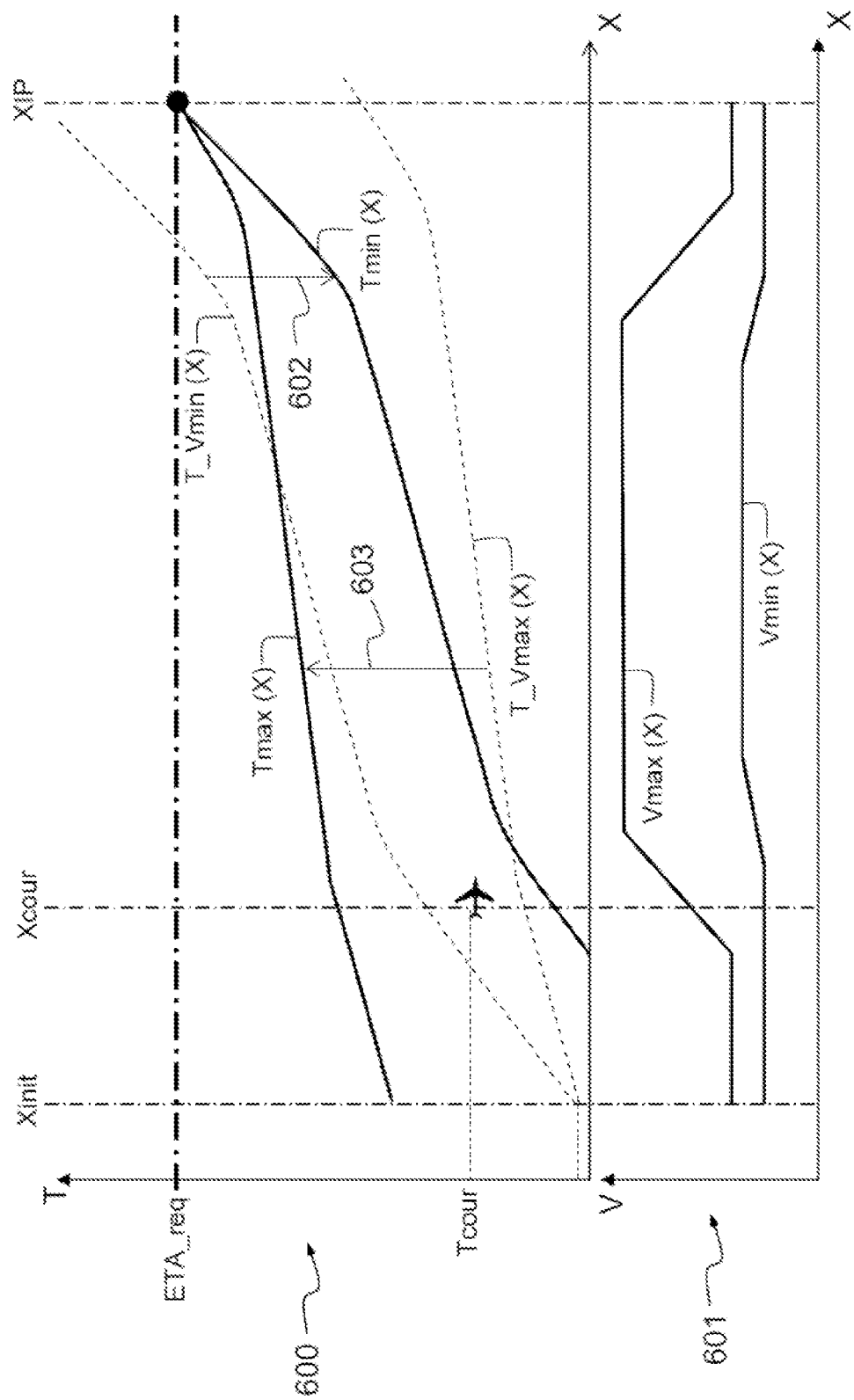
FIG. 6 graphically illustrates the way in which the profiles Tmin(X) and Tmax(X) can be deduced from the profiles T_Vmin(X) and T_Vmax(X)

FIG. 6 graphically shows the way in which the profiles Tmin(X) and Tmax(X) can be deduced from the profiles T_Vmin(X) and T_Vmax(X).

The two profiles Tmin(X) and Tmax(X) associated with the speeds Vmin(X) and Vmax(X) are deduced from the profiles T_Vmin(X) and T_Vmax(X), respectively, by translation, as explained previously. They represent limits allowing the required spacing to be guaranteed. The upper portion 600 of the figure shows the translation 602 of the profile T_Vmin(X) and the translation 603 of the profile T_Vmax (X). The lower portion 601 shows the minimum and maximum speeds Vmin(X) and Vmax(X), respectively.

Figure 7A:
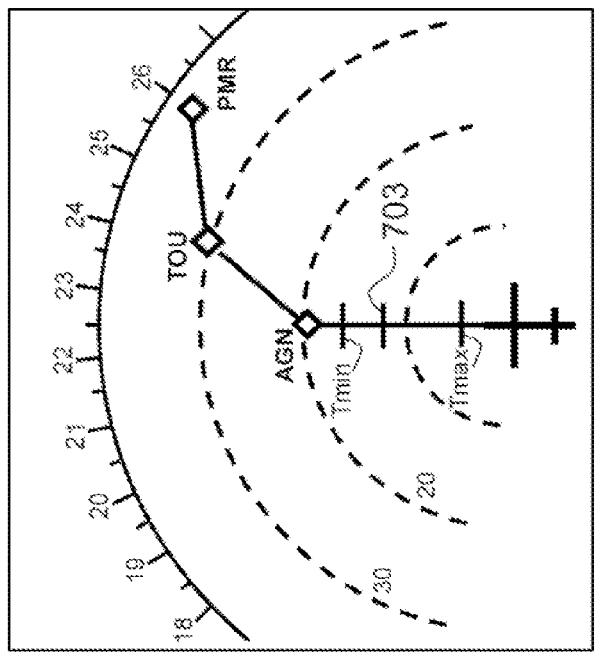
FIGS. 7a, 7b and 7c provide display examples for the method according to the invention.
Figure 7B:
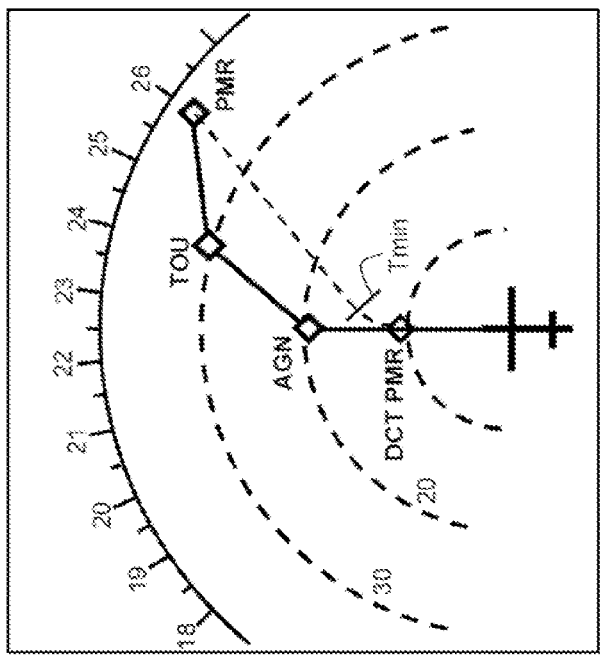
Figure 7C:
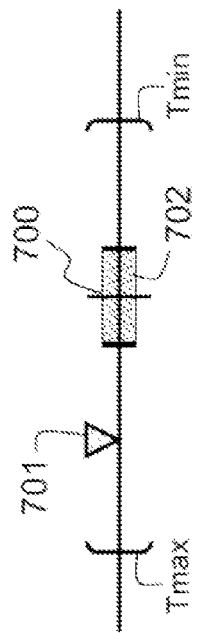

FIGS. 7*a*, 7*b* and 7*c* provide examples of display of the method according to the invention in which notably the spacing 703 appears. FIG. 7*c* shows Tmin, Tmax, the current spacing 701, the instruction 700 and the tolerance 702.

The invention claimed is:

1. A method for guaranteeing a temporal spacing between an aircraft and at least one reference moving object, said temporal spacing being guaranteed no later than at a point in a flight plan called a point of interception, with the aircraft following a current flight plan, wherein feasibility of guaranteeing the temporal spacing at a date Tcour by regulating a speed of the aircraft while maintaining the current flight plan is verified, the method comprising:
   determining two speed profiles Tmin(X), Tmax(X) which comply with transit at a date ETAreq which guarantees a temporal spacing between an aircraft and at least one reference moving object and which is associated with a point of interception, a speed profile being composed of points indexed by a date and a position index, the two speed profiles Tmin(X), Tmax(X) being determined based on a minimum speed and a maximum speed, respectively, which the aircraft can attain,
   verifying whether a date Tcour is contained within a feasibility range with two limits Bmin, Bmax which are equal to values taken by the two speed profiles Tmin(X) and Tmax(X), respectively, for a position Xcour of the aircraft at the date Tcour, with a feasibility of the date Tcour being verified, and
   modifying a current flight plan using a processor when the feasibility is not verified, a lateral trajectory which adjusts a distance between the current position Xcour of the aircraft and the point of interception being implemented such that the temporal spacing can be attained by regulating a speed of the aircraft.

2. The method according to claim 1, further comprising acquiring the point of interception and assessing the required date of transit ETAreq for the aircraft at the point of interception, the date of transit ETAreq being assessed based on predictions of transit times of the at least one reference moving object.

3. The method according to claim 1, further comprising acquiring a distance between the reference moving object and the point of interception, the required date of transit ETAreq for the aircraft at the point of interception then being deduced from the distance such that a delay is guaranteed at the date ETAreq.

4. The method according to claim 3, wherein the distance is assessed on a basis of stored information relating to a trajectory of the reference moving object or on a basis of predictions of the trajectory of the at least one reference moving object.

5. The method according to claim 3, wherein the distance is assessed by assuming that the at least one reference moving object flies directly towards the point of interception.

6. The method according to claim 3, wherein the at least one reference moving object regularly transmits an assessment of the distance to the aircraft.

7. The method according to claim 1, further comprising modifying the speed profile Tmin(X) to take into account a deceleration towards an assessed speed of the at least one reference moving object at the point of interception to reduce a difference between the speed of the aircraft and a speed of the at least one reference moving object upon transit by the point of interception.

8. The method according to claim 1, further comprising modifying the speed profile Tmax(X) to take into account an acceleration towards an assessed speed of the at least one reference moving object at the point of interception to reduce a difference between the speed of the aircraft and a speed of the at least one reference moving object upon transit by the point of interception.

9. The method according to claim 1, further comprising determining a length δD by which a trajectory stored in the current flight plan needs to be modified.

10. The method according to claim 9, wherein a time difference Ec between the current date Tcour and the limits of the feasibility range is determined, the length δD being deduced by using the following expression:

$$\delta D = Ec/V\text{ground}$$

in which Vground is chosen as a function of a resolution strategy between:
- a current ground speed GS(X_cour) of the aircraft;
- a current minimum ground speed Vmin(X_cour) of the aircraft at this point; or
- a current maximum ground speed Vmax(X_cour) of the aircraft at this point.

11. The method according to claim 9, wherein a time difference Ec between the current date Tcour and the limits of the feasibility range is determined, the length δD being deduced by using the following expression:

$$\delta D = Ec/V\text{ground}$$

In which Vground is a ratio between a current ground speed of the aircraft and an assessed speed of the at least one reference moving object at a point of convergence with an initial trajectory defined before modifying the flight plan.

12. The method according to claim 11, wherein the distance δD is augmented by adding a robustness margin.

13. The method according to claim 9, wherein the lateral trajectory is determined by selecting at least one turning point to adjust a length of a current trajectory between a current position and the point of interception of length δD.

14. The method according to claim 13, wherein the lateral trajectory corresponds to a trajectory defined by a first point called a point of divergence, the at least one turning point and a point of convergence, the point of divergence and the point of convergence being positioned on an initial trajectory defined before modifying the flight plan, and no later than at the point of interception.

15. The method according to claim 1, wherein the minimum and maximum speeds which can be attained respectively correspond firstly to a minimum authorized and flyable speed and secondly to a maximum authorized and flyable speed.

16. The method according to claim 1, wherein the speed of the aircraft is adapted using speed instructions, said speed instructions being determined to ensure acquisition and then maintenance of said spacing relative to the reference moving object and being sent to an automatic pilot of the aircraft.

17. A device for controlling the temporal spacing between at least one aircraft and at least one reference moving object, the device being configured to:
- determine two speed profiles Tmin(X), Tmax(X) which comply with transit at a date ETAreq which guarantees a temporal spacing between an aircraft and at least one reference moving object and which is associated with a point of interception, a speed profile being composed of points indexed by a date and a position index, the two speed profiles Tmin(X), Tmax(X) being determined based on a minimum speed and a maximum speed, respectively, which the aircraft can attain,
- verify whether a date Tcour is contained within a feasibility range with two limits Bmin, Bmax which are equal to values taken by the two speed profiles Tmin(X) and Tmax(X), respectively, for a position Xcour of the aircraft at the date Tcour, with a feasibility of the date Tcour being verified, and
- modify a current flight plan using a processor when the feasibility is not verified, a lateral trajectory which adjusts a distance between the current position Xcour of the aircraft and the point of interception being implemented such that the temporal spacing can be attained by regulating a speed of the aircraft.

18. The control device according to claim 17, wherein the device is located on board an aircraft.

19. The device according to claim 17, wherein the device is installed in a station on the ground.

20. A system for guaranteeing a temporal spacing between at least one aircraft and at least one reference moving object, the system comprising means distributed between said aircraft and a control station on the ground, the system comprising:
- means for determining two speed profiles Tmin(X), Tmax(X) which comply with transit at a date ETAreq which guarantees a temporal spacing between an aircraft and at least one reference moving object and which is associated with a point of interception, a speed profile being composed of points indexed by a date and a position index, the two speed profiles Tmin(X), Tmax(X) being determined based on a minimum speed and a maximum speed, respectively, which the aircraft can attain,
- means for verifying whether a date Tcour is contained within a feasibility range with two limits Bmin, Bmax which are equal to values taken by the two speed profiles Tmin(X) and Tmax(X), respectively, for a position Xcour of the aircraft at the date Tcour, with a feasibility of the date Tcour being verified, and means for modifying a current flight plan using a processor when the feasibility is not verified, a lateral trajectory which adjusts a distance between the current position Xcour of the aircraft and the point of interception being implemented such that the temporal spacing can be attained by regulating a speed of the aircraft.

21. The system according to claim 20, wherein an ADS-B standard is implemented in the system.

* * * * *